United States Patent [19]
Tsai

[11] Patent Number: 5,864,133
[45] Date of Patent: Jan. 26, 1999

[54] COST-EFFECTIVE OPTICAL DEVICE

[75] Inventor: Jenn-Tsair Tsai, Hsinchu, Taiwan

[73] Assignee: Mustek System Inc., Hsinchu, Taiwan

[21] Appl. No.: 910,089

[22] Filed: Aug. 12, 1997

[51] Int. Cl.⁶ .............................. H04N 1/04; H04N 1/393
[52] U.S. Cl. ........................................ 250/208.1; 358/474
[58] Field of Search .............................. 250/208.1, 234, 250/235, 236; 358/296, 451, 474, 482, 483

[56] References Cited

U.S. PATENT DOCUMENTS

5,734,477  3/1998  Tsai ......................................... 358/474

Primary Examiner—Edward P. Westin
Assistant Examiner—Kevin Pyo
Attorney, Agent, or Firm—Madson & Metcalf

[57] ABSTRACT

A cost-effective optical device is used for converting a photo-image into electronic signals with high resolution. The optical device includes a plurality of focusing units for receiving a plurality of sections of the photo-image respectively, and generating a plurality of corresponding focused image sections wherein the focusing units are mounted in specific locations for focusing the plurality of sections of the photo-image through various light paths and at various distance, and the plurality of corresponding focused image sections are magnified with the same ratio, a photoelectric conversion unit for sequentially converting the plurality of corresponding focused image sections into the electronic signals, and a light-reflecting unit mounted between the plurality of focusing units and the photoelectric conversion unit for sequentially transmitting the plurality of corresponding focused image sections to the photoelectric conversion unit.

9 Claims, 6 Drawing Sheets

COST-EFFECTIVE OPTICAL DEVICE

FIELD OF THE INVENTION

The present invention is related to an optical device with high resolution, and more particularly to a cost-effective optical device with high resolution used for a scanner.

BACKGROUND OF THE INVENTION

Figure 1:
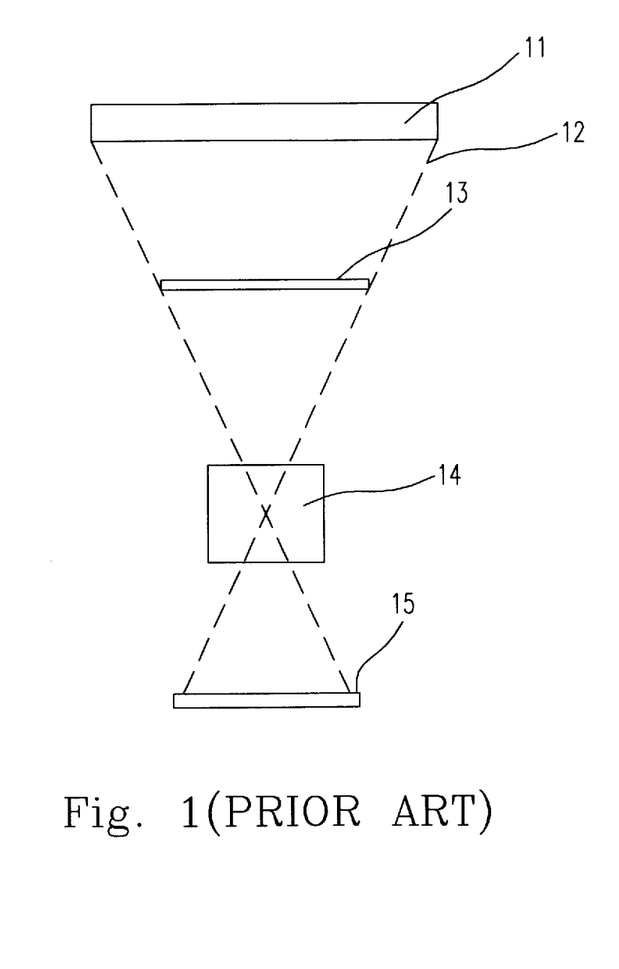
FIG. 1 is a schematic diagram showing an operating principle of a scanner according to a prior art.

Image processing is often heard of in photography and movies. The scanner is an indispensable part of this technology. Increasing the resolution of the scanner is investigated hard in order to get more clear images, but high cost is not avoidable with high resolution scanners. The operating principle of the conventional scanner is shown in FIG. 1. An article 11 is placed in the scanner to be scanned. The photo-image 12 of the article 11 is focused on a charge coupled device 15 by a lens set 14, and then is converted into electronic signals to form digital information. A mirror set 13 is used for reflecting the light, so the length of the light path does not have to be shortened even though the height of the scanner is reduced. When higher resolution is required, the number of cells for the charge coupled device 15 must be increased. The cost of the charge coupled device 15 is proportional to the square of the number of cells for it. Requiring higher resolution will thus cost much since the cost of a charge coupled device 15 is a great part of the production cost of a scanner. It is clear that high resolution and low cost are difficult to be harmonized according to the stated prior art.

Figure 2:
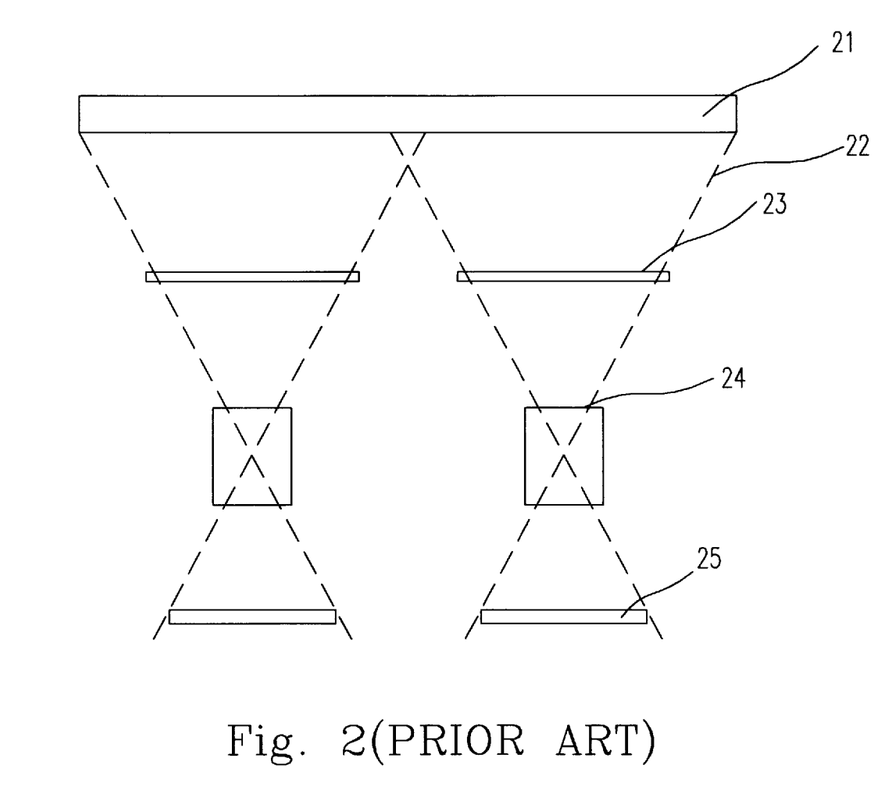
FIG. 2 is a schematic diagram showing an operating principle of a scanner according to another prior art.

Another prior art has been developed to obviate the trouble of high-cost. Please refer to FIG. 2 showing the working principle of a scanner according to the second prior art. The photo-image 22 of the scanned article 21 is divided into more sections. There are as many corresponding mirror sets 23, lens sets 24, and charge coupled devices 25 as the photo-image sections in this scanner. Different sections of the photo-image 22 are converted into electronic signals via the same steps as the first prior art by respective mirror sets 23, lens sets 24, and charge coupled devices 25. The electronic signals will be combined to form a full image later. Hence, the number of cells for a charge coupled device 25 is reduced, but the performance can be maintained to correspond to that achieved by the prior art with number of cells remained the same. This arrangement can reduce the cost, and the cost is proportional to the number of charge coupled devices 25. However, we still hope to make a big step forward in increasing resolution and decreasing cost.

SUMMARY OF THE INVENTION

An objective of the present invention is to provide a cost-effective optical device with high resolution, while having less cells for photoelectric conversion device.

In accordance with the present invention, a cost-effective optical device for converting a photo-image into electronic signals includes a plurality of focusing units, a photoelectric conversion unit, and a light-reflecting unit mounted between the focusing units and the photoelectric conversion unit. The focusing units are used for receiving a plurality of sections of the photo-image respectively, and generating a plurality of corresponding focused image sections wherein the focusing units are mounted in specific locations for focusing the plurality of sections of the photo-image through various light paths and at various distance, and getting the plurality of corresponding focused image sections magnified with the same ratio. The photoelectric conversion unit, e.g. charge coupled device, is used for sequentially converting the corresponding focused image sections into the electronic signals. The light-reflecting unit is used for sequentially transmitting the corresponding focused image sections to the photoelectric conversion unit.

In accordance with another aspect of the present invention, each of the focusing units is a lens set for focusing one of the sections of the photo-image.

In accordance with another aspect of the present invention, the light-reflecting unit may include a reflective mirror and a control device connected to the reflective mirror. The reflective mirror is used for reflecting the corresponding focused image sections to the photoelectric conversion unit, and the control device is used for moving the reflective mirror to be sequentially located within the various light paths.

In accordance with another aspect of the present invention, the light-reflecting unit may further include a plurality of reflective mirrors mounted in the various light paths and a control device connected to the reflective mirrors. The reflective mirrors are used for respectively reflecting the corresponding focused image sections to the photoelectric conversion unit, and the control device is used for sequentially turning one of the reflective mirrors to an active angle while keeping the others of the reflective mirrors at inactive angles when one of the reflective mirrors is at the active angle. When a reflective mirror is at an active angle such as 45°, the corresponding focused image section is transmitted to the photoelectric conversion unit by the reflective mirror. When a reflective mirror is at an inactive angle horizontally, the corresponding focused image section can not be transmitted to the photoelectric conversion unit.

In accordance with another aspect of the present invention, the number of the focusing units, each of which is used for focusing one of the photo-image sections through one light path, is from 2 to 4.

In accordance with another aspect of the present invention, the number of the focusing units is 3 wherein the focusing units includes a first lens set for receiving a first section of the photo-image and generating a first focused image section through a first light path, a second lens set for receiving a second section of the photo-image and generating a second focused image section through a second light path, and a third lens set for receiving a third section of the photo-image and generating a third focused image section through a third light path.

In accordance with another aspect of the present invention, the light-reflecting unit includes a reflective mirror and a control device connected to the reflective mirror. The reflective mirror is located sequentially within the first light path, the second light path, and the third light path for reflecting the first focused image section, the second focused image section, and the third focused image section to the photoelectric conversion unit respectively. The control device is used for moving the reflective mirror to be located within the first light path, the second light path, and the third light path sequentially.

In accordance with another aspect of the present invention, the light-reflecting unit includes a first reflective mirror, a second reflective mirror, a third reflective mirror, and a control device connected to the three reflective mirrors. The first reflective mirror, the second reflective mirror, and the third reflective mirror are mounted respectively within the first light path, the second light path, and the third light path for reflecting the first focused image section, the second focused image section, and the third focused image section to the photoelectric conversion unit. The control device is used for turning the first reflective mirror to an active angle to reflect the first focused image section, turning the first reflective mirror to an inactive angle and turning the second reflective mirror to the active angle to reflect the second focused image section, and turning the second reflective mirror to the inactive angle and turning the third reflective mirror to the active angle to reflect the third focused image section.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 3:
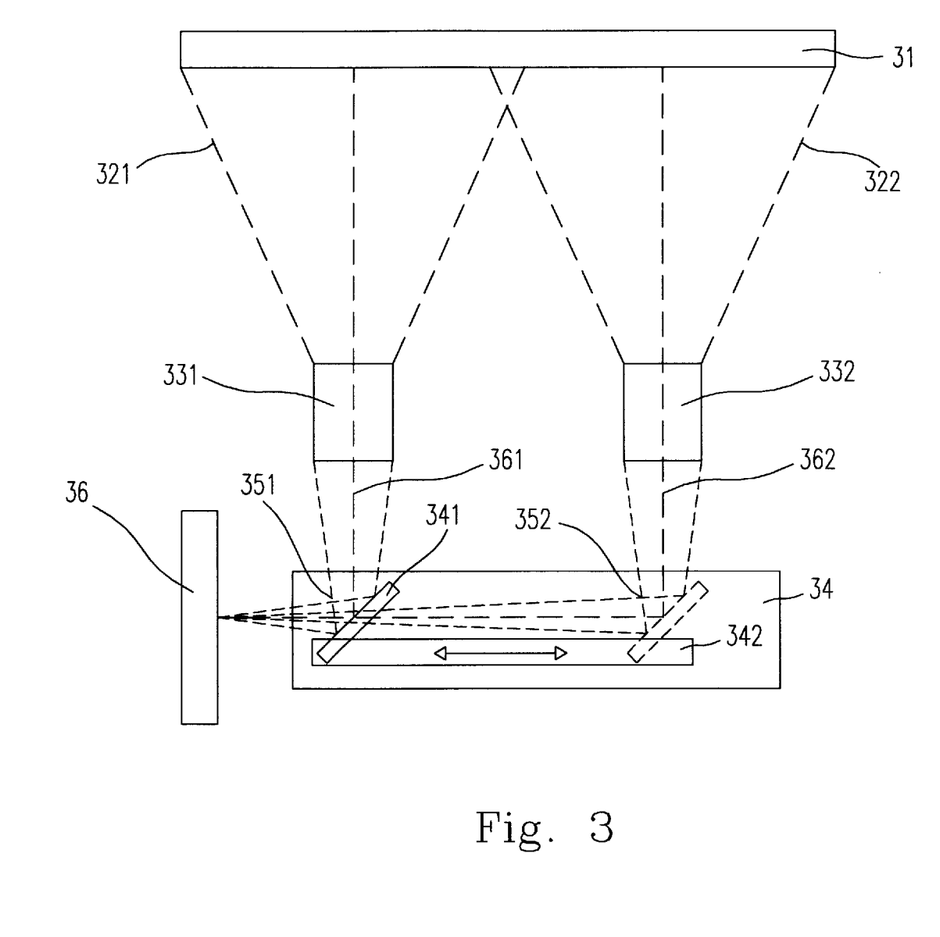
FIG. 3 is a schematic diagram showing a preferred embodiment of a scanner according to the present invention.

Please refer to FIG. 3 which is a schematic diagram showing a preferred embodiment of a scanner according to the present invention. An article 31 is placed in a scanner and is lit by a light source to generate a photo-image. The photo-image is divided into two sections 321 and 322 to be converted respectively. The first photo-image section 321 is focused by a lens set 331 to generate a first focused image section 351 through a light path 361, while the second photo-image section 322 is focused by a lens set 332 to generate a second focused image section 352 through another light path 362. The ratio of the size of the focused image section to the size of the photo-image section for the first photo-image section 321 is the same as that for the second photo-image section 322. Therefore, when we combine these two image sections, the full image will not be distorted. The light-reflecting unit 34 includes a reflective mirror 341 and a control device 342. The control device 342 is connected to the reflective mirror 341 and used for moving the reflective mirror 341 to be located at a desired position. The reflective mirror 341 is first located within the light path 361 and reflects the first focused image section 351 to the charge coupled device 36. The first focused image section 351 is converted into electronic signals by the charge coupled device 36. Then, the control device 342 moves the reflective mirror 341 to be located within the light path 362, so that reflective mirror 341 reflects the second focused image section 352 to the charge coupled device 36. The second focused image section 352 is then converted into electronic signals by the charge coupled device 36. All these electronic signals are transformed to digital information and an entire image is shown on a computer or other image processing equipments.

Figure 4:
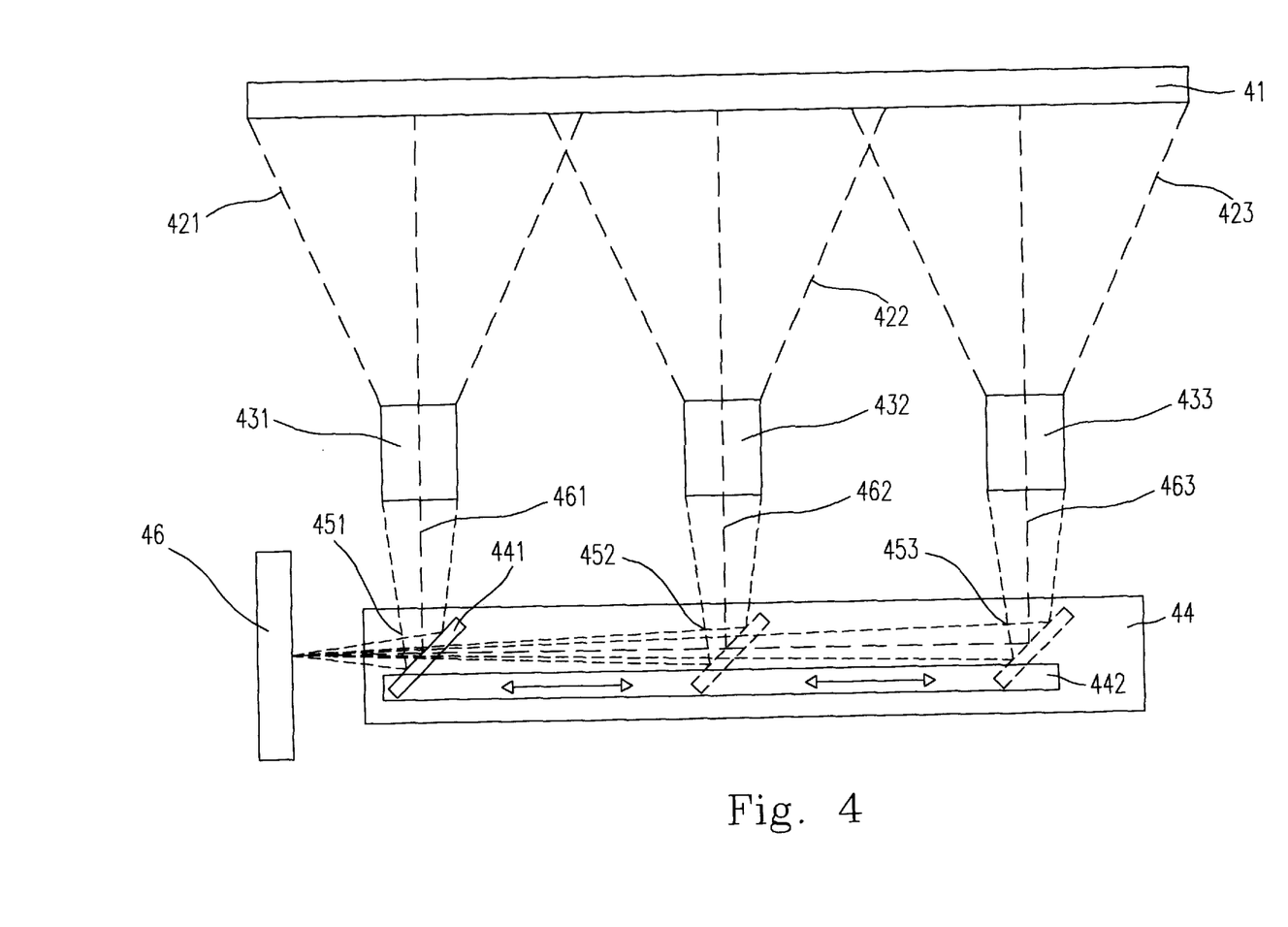
FIG. 4 is a schematic diagram showing another preferred embodiment of a scanner according to the present invention.

Please refer to FIG. 4 which is a schematic diagram showing another preferred embodiment of a scanner according to the present invention. An article 41 is placed in a scanner and is lit by a light source to generate a photo-image. The photo-image is divided into three sections 421, 422, and 423 to be converted respectively. The first photo-image section 421 is focused by a lens set 431 to generate a first focused image section 451 through one light path 461; the second photo-image section 422 is focused by a lens set 432 to generate a second focused image section 452 through another light path 462; the third photo-image section 423 is focused by a lens set 433 to generate a third focused image section 453 through the other light path 463. The ratios of the size of the focused image section to the size of the photo-image section for the first photo-image section 421, the second photo-image section 422, and the third photo-image section 423 are the same. Therefore, when we combine these three image sections, the full image will not be distorted. The light-reflecting unit 44 includes a reflective mirror 441 and a control device 442. The control device 442 is connected to the reflective mirror 441 and used for moving the reflective mirror 441 to be located at a desired position. First, the reflective mirror 441 is located within the light path 461 and reflects the first focused image section 451 to the charge coupled device 46. Then, the first focused image section 451 is converted into electronic signals by the charge coupled device 46. Secondly, the control device 442 moves the reflective mirror 441 to be located within the light path 462, so that reflective mirror 441 reflects the second focused image section 452 to the charge coupled device 46. Then, the second focused image section 452 is converted into electronic signals by the charge coupled device 46. Last, the control device 443 moves the reflective mirror 442 to be located within the light path 463, and the reflective mirror 441 reflects the third focused image section 453 to the charge coupled device 46. The third focused image section 453 is then converted into electronic signals by the charge coupled device 46. All these electronic signals are transformed to digital information and an entire image is shown on a computer or other image processing equipments.

The characteristic of these two preferred embodiments is that a light-reflecting unit is added to reflect the light direction, so that different focused image sections may be sequentially transmitted to the charge coupled device. Less charge coupled devices or less cells for a charge coupled device are required in this case without reducing resolution. Some focusing units and a light-reflecting unit required for the embodiment according to the present invention cost much less than a charge coupled device. Therefore, the cost is highly reduced.

The number of the focusing units can be extended to meet one's requirement. Their working functions are similar to the ones stated above.

Figure 5:
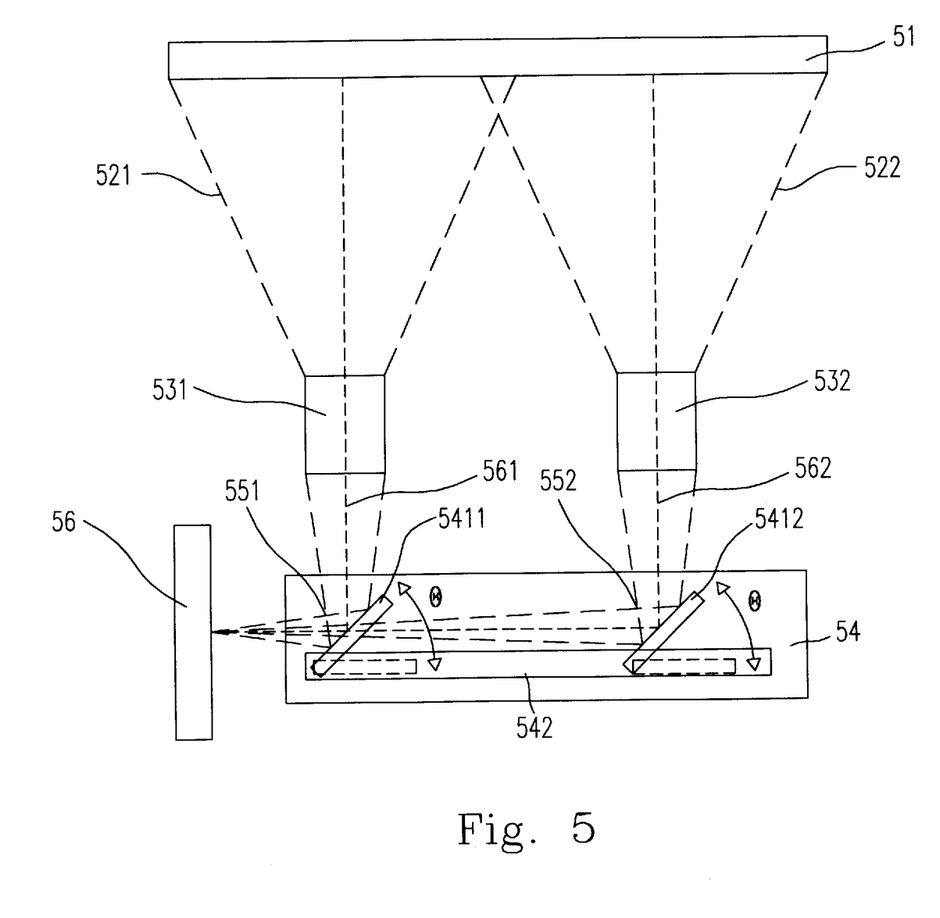
FIG. 5 is a schematic diagram showing a third preferred embodiment of a scanner according to the present invention.

Please refer to FIG. 5 which is a schematic diagram showing a third preferred embodiment of a scanner according to the present invention. An article 51 is placed in a scanner and is lit by a light source to generate a photo-image. The photo-image is divided into two sections 521 and 522 to be converted respectively. The first photo-image section 521 is focused by a lens set 531 to generate a first focused image section 551 through a light path 561, while the second photo-image section 522 is focused by a lens set 532 to generate a second focused image section 552 through another light path 562. The ratio of the size of the focused image section to the size of the photo-image section for the first photo-image section 521 is the same as that for the second photo-image section 522, too. Therefore, when we combine these two image sections, the full image will not be distorted. The light-reflecting unit 54 includes two reflective mirrors 5411 and 5412 and a control device 542. The control device 542 is connected to the reflective mirrors 5411 and 5412, and used for respectively turning the reflective mirrors 5411 and 5412 to certain angles Θ such as 0° and 45°. The first reflective mirror 5411 is within the light path 561 while the second reflective mirror 5412 is within the other light path 562. During the first operating period, the first reflective mirror 5411 is turned to an active angle Θ to reflect the first focused image section 551 to the charge coupled device 56 while the second reflective mirror 5412 is kept at an inactive angle so that the charge coupled device 56 does not receive the second focused image section 552. And the first focused image section 551 is converted into electronic signals by the charge coupled device 56. During the second operating period, the control device 542 turns the second reflective mirror 5412 to an active angle Θ in order to reflect the second focused image section 552 to the charge coupled device 56. At the same time, the control device 542 turns the first reflective mirror 5412 back to an inactive angle, so that the charge coupled device 56 does not receive the first focused image section 551. The second focused image section 552 is then converted into electronic signals by the charge coupled device 56. All these electronic signals are transformed to digital information and an entire image can thus be shown on a computer or other image processing equipments.

Figure 6:
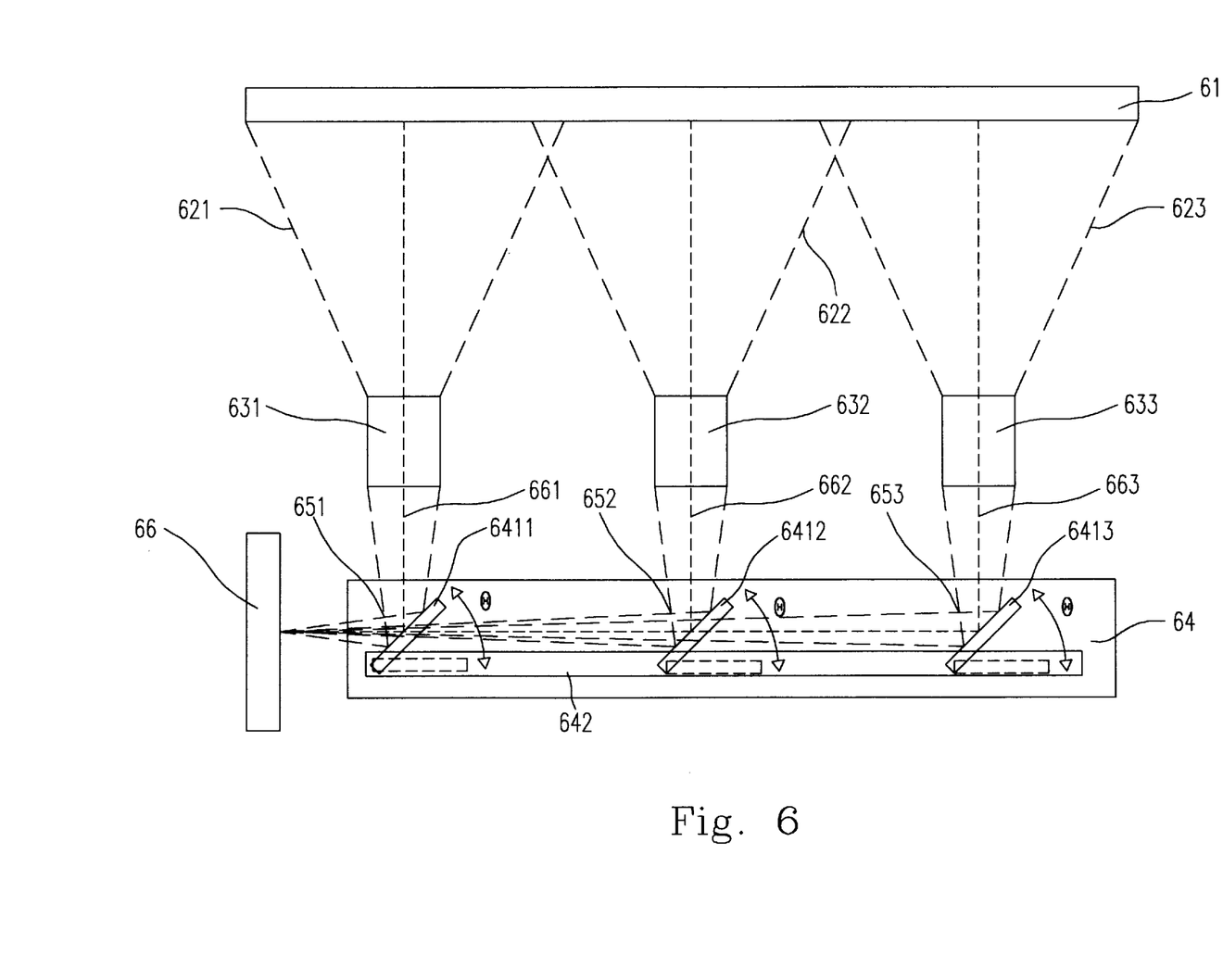
FIG. 6 is a schematic diagram showing a fourth preferred embodiment of a scanner according to the present invention.

Please refer to FIG. 6 which is a schematic diagram showing a fourth preferred embodiment of a scanner according to the present invention. An article 61 is placed in a scanner and is lit by a light source to generate a photo-image. The photo-image is divided into three sections 621, 622, and 623 to be converted respectively. The first photo-image section 621 is focused by a lens set 631 to generate a first focused image section 651 through one light path 661; the second photo-image section 622 is focused by a lens set 632 to generate a second focused image section 652 through another light path 662; the third photo-image section 623 is focused by a lens set 633 to generate a third focused image section 653 through the other light path 663. The ratios of the size of the focused image section to the size of the photo-image section for the first photo-image section 621, the second photo-image 622, and the third photo-image 623 are the same, too. Therefore, when we combine these three image sections, the full image will not be distorted. The light-reflecting unit 64 includes three reflective mirrors 6411, 6412, and 6413 and a control device 642. The control device 642 is connected to the three reflective mirrors 6411, 6412, and 6413, and used for respectively turning the three reflective mirrors 6411, 6412, and 6413 to certain angles Θ such as 0° and 45°. The first reflective mirror 6411 is within one light path 661; the second reflective mirror 6412 is within another light path 662; the third reflective mirror 6413 is within the other light path 663. During the first operating period, the first reflective mirror 6411 is turned to an active angle Θ to reflect the first focused image section 651 to the charge coupled device 66 while the other reflective mirrors 6412 and 6413 are kept at inactive angles so that the charge coupled device 66 does not receive the other focused image sections 652 and 653. Then, the first focused image section 651 is converted into electronic signals by the charge coupled device 66. During the second operating period, the control device 642 turns the second reflective mirror 6412 to an active angle Θ in order to reflect the second focused image section 652 to the charge coupled device 66. At the same time, the control device 642 turns the other reflective mirrors 6411 and 6413 back to inactive angles, so that the charge coupled device 66 does not receive the other focused image sections 651 and 653. The second focused image section 652 is then converted into electronic signals by the charge coupled device 66. During the third operating period, the control device 642 turns the third reflective mirror 6413 to an active angle Θ in order to reflect the third focused image section 653 to the charge coupled device 66. At the same time, the control device 642 turns the other reflective mirrors 6411 and 6412 back to inactive angles, and the charge coupled device 66 can not receive the other focused image sections 651 and 652. The third focused image section 653 is then converted into electronic signals by the charge coupled device 66. All these electronic signals are transformed to digital information and an entire image can thus be shown on a computer or other image processing equipments.

The characteristic of these two preferred embodiment is that a light-reflecting unit is added to reflect the light direction. Each focusing units has its corresponding reflective mirror to transmit the focused image sections to the charge coupled device. The reflective mirrors do not move but turn to a certain angle Θ in turn when in use. We can spend less time compared to the prior preferred embodiments because that the reflective mirrors do not have to move. But the cost increases slightly because that more reflective mirrors are required. Similar to the prior preferred embodiments, different focused image sections may be sequentially transmitted to the charge coupled device. Less charge coupled devices or less cells for a charge coupled device are required, but the resolution is not lowered. Some focusing units and a light-reflecting unit which are added according to the present invention cost much less than a charge coupled device. Therefore, the cost is highly reduced.

The number of the focusing units also can be extended to meet one's requirement. Their working functions are similar to those stated above.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cost-effective optical device for converting a photo-image into electronic signals, comprising:

a plurality of focusing units for receiving a plurality of sections of said photo-image respectively, and generating a plurality of corresponding focused image sections, said focusing units being mounted in specific locations for focusing said plurality of sections of said photo-image through various light paths and at various distance, and getting said plurality of corresponding focused image sections magnified with the same ratio;

a photoelectric conversion unit for sequentially converting said plurality of corresponding focused image sections into said electronic signals; and a light-reflecting unit mounted between said plurality of focusing units and said photoelectric conversion unit for sequentially transmitting said plurality of corresponding focused image sections to said photoelectric conversion unit.

2. An optical device according to claim 1 wherein each of said focusing units is a lens set for focusing one of said plurality of sections of said photo-image.

3. An optical device according to claim 1 wherein said light-reflecting unit includes:
   a reflective mirror for reflecting said plurality of corresponding focused image sections to said photoelectric conversion unit; and
   a control device connected to said reflective mirror for moving said reflective mirror to be sequentially located within said various light paths.

4. An optical device according to claim 1 wherein said light-reflecting unit further includes:
   a plurality of reflective mirrors mounted in said various light paths for respectively reflecting said plurality of said corresponding focused image sections to said photoelectric conversion unit; and
   a control device connected to said plurality of reflective mirrors for sequentially turning one of said plurality of reflective mirrors to an active angle while keeping the others of said plurality of reflective mirrors at inactive angles.

5. An optical device according to claim 1 wherein said photoelectric conversion unit is a charge coupled device.

6. An optical device according to claim 1 wherein the number of said focusing units is from 2 to 4.

7. An optical device according to claim 6 wherein said plurality of focusing units are three focusing units, further including:
   a first lens set for receiving a first section of said photo-image and generating a first focused image section through a first light path;
   a second lens set for receiving a second section of said photo-image and generating a second focused image section through a second light path; and
   a third lens set for receiving a third section of said photo-image and generating a third focused image section through a third light path.

8. An optical device according to claim 7 wherein said light-reflecting unit includes:
   a reflective mirror located sequentially within said first light path for reflecting said first focused image section to said photoelectric conversion unit, within said second light path for reflecting said second focused image section to said photoelectric conversion unit, and within said third light path for reflecting said third focused image section to said photoelectric conversion unit; and
   a control device connected to said reflective mirror for moving said reflective mirror to be located within said first light path, said second light path, and said third light path sequentially.

9. An optical device according to claim 7 wherein said light-reflecting unit includes:
   a first reflective mirror mounted within said first light path for reflecting said first focused image section to said photoelectric conversion unit;
   a second reflective mirror mounted within said second light path for reflecting said second focused image section to said photoelectric conversion unit;
   a third reflective mirror mounted within said third light path for reflecting said third focused image section to said photoelectric conversion unit; and
   a control device connected to said three reflective mirrors for turning said first reflective mirror to an active angle and turning said second reflective mirror and said third reflective mirror to an inactive angle to reflect said first focused image section, turning said second reflective mirror to said active angle and turning said first reflective mirror and said third reflective mirror to an inactive angle to reflect said second focused image section, and turning said third reflective mirror to an active mirror and turning said first reflective mirror and said second reflective mirror to said inactive angle to reflect said third focused image section.

* * * * *